United States Patent
Radhakrishnan

(10) Patent No.: US 10,376,090 B2
(45) Date of Patent: Aug. 13, 2019

(54) AUTO SHOT ADJUSTMENT FOR GRINDER

(71) Applicant: BUNN-O-MATIC CORPORATION, Springfield, IL (US)

(72) Inventor: Suresh Radhakrishnan, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 250 days.

(21) Appl. No.: 14/374,468

(22) PCT Filed: Jan. 24, 2013

(86) PCT No.: PCT/US2013/022982
§ 371 (c)(1),
(2) Date: Jul. 24, 2014

(87) PCT Pub. No.: WO2013/112732
PCT Pub. Date: Aug. 1, 2013

(65) Prior Publication Data
US 2014/0366743 A1     Dec. 18, 2014

Related U.S. Application Data

(60) Provisional application No. 61/590,325, filed on Jan. 24, 2012.

(51) Int. Cl.
*A47J 31/42* (2006.01)
(52) U.S. Cl.
CPC ..................... *A47J 31/42* (2013.01)
(58) Field of Classification Search
CPC ........................................ A47J 31/42
USPC ............................................. 99/286
See application file for complete search history.

(56) References Cited

U.S. PATENT DOCUMENTS

| | | | |
|---|---|---|---|
| 5,522,556 A | 6/1996 | Knepler et al. | |
| 5,718,163 A | 2/1998 | Termini | |
| 6,095,032 A * | 8/2000 | Barnett | A47J 31/404 100/145 |
| 7,874,505 B1 | 1/2011 | Lassota | |
| 2010/0170971 A1* | 7/2010 | Doglioni Majer | A47J 42/18 241/30 |
| 2011/0212231 A1 | 9/2011 | McLaughlin | |

FOREIGN PATENT DOCUMENTS

| | | |
|---|---|---|
| CN | 101232829 | 7/2008 |
| CN | 201098000 | 8/2008 |
| CN | 101621948 | 1/2010 |
| CN | 101641039 | 2/2010 |

(Continued)

OTHER PUBLICATIONS

Office Action issued in Application No. CN 201380006583.2 (dated Dec. 30, 2015 ).

(Continued)

*Primary Examiner* — Dana Ross
*Assistant Examiner* — Kuangyue Chen
(74) *Attorney, Agent, or Firm* — Barnes & Thornburg LLP

(57) ABSTRACT

A system, method and apparatus used for controllably grinding coffee beans for use in an espresso machine. The system includes a grinder mechanism and an adjustment mechanism to adjust the grind of food product, such as coffee, produced by the grinder.

5 Claims, 3 Drawing Sheets

(56) References Cited

FOREIGN PATENT DOCUMENTS

| CN | 101778586 | 7/2010 |
|---|---|---|
| EP | 0766943 | 4/1997 |
| EP | 2471422 | 7/2012 |
| TW | 548139 | 8/2003 |
| WO | WO 01/23095 | 4/2001 |
| WO | WO 2008/105017 | 9/2008 |
| WO | WO 2009/010190 | 1/2009 |
| WO | WO 2011/130439 | 10/2011 |
| WO | WO 2012/138327 | 10/2012 |

OTHER PUBLICATIONS

Office Action issued in Application No. CN 201380006583.2 (dated Oct. 21, 2016).
Search Report and Written Opinion issued in App. No. PCT/US2013/022982 (2013).
Supplementary European Search Report issued in App. No. EP13740626.0 (2015).
Office Action issued in EP Appl. No. 13740626.0 (Jun. 6, 2019).

* cited by examiner

AUTO SHOT ADJUSTMENT FOR GRINDER

CROSS REFERENCE TO RELATED APPLICATIONS

This application is a U.S. nationalization under 35 U.S.C. § 371 of International Application No. PCT/US2013/022982, filed Jan. 24, 2013, which claims the benefit of priority under 35 U.S.C. § 119(e) to U.S. Provisional Patent Application No. 61/590,325, filed Jan. 24, 2012. The disclosures set forth in the referenced applications are incorporated herein by reference in their entireties.

BACKGROUND

A system, method and apparatus is disclosed for controllably grinding coffee beans for use in an espresso machine. The disclosure includes a system, method and apparatus for controllably adjusting the grinder to maintain a desired tolerance for the espresso produced by the espresso machine. The system, method, and apparatus include monitoring of at least one of several espresso related parameters to monitor whether the espresso is being brewed within a desired tolerance or set of tolerances. The system, method and apparatus provide feedback to an automatically adjustable grinder to at least one of increase or decrease the grinding time so as to produce more or less ground coffee and increase or decrease the size of the particles ground by the grinder by making the grinder adjustment to produce more course or more fine particles. The system, method and apparatus can be used at the start up of an espresso machine to calibrate the espresso machine using one or more brewing cycles or comparing the results to some predetermined historical data or both. Also, this disclosure can be used in a "running" fashion to continuously or periodically monitor espresso parameters throughout the operation of the espresso machine and not only as a calibration tool.

A variety of espresso machines and grinders are used on a frequent basis to prepare espresso beverages. Espresso is widely consumed throughout the world with increasing numbers of espresso drinkers every day. The espresso drink may be prepared either as a straight espresso, or the espresso may be used as an ingredient with milk or other ingredients to prepare drinks such as cappuccinos and lattes.

It is desirable to produce espresso which is consistently and reliably tuned to a desired set of parameters. In this regard, it is desirable to produce espresso which has constant temperature, consistency, flavor, aroma as well as other perceived characteristics. An espresso beverage which is consistent a number of parameters can be adjusted and set. In this regard, water can be filtered and heated to a specified temperature. Many water systems have been successful at maintaining relatively tight tolerances in the brewing process. The machine can be configured for accurate and reliably repeatable settings so that the water in combination with the machine will be consistent throughout repeated brew cycles. Of course, calibration may be needed at the start up of the machine or periodically throughout the brewing process.

One of the key variables in producing espresso is the coffee bean which is used to produce the beverage. A wide variety of coffee beans grown in a wide variety of locations and conditions, and roasted to different levels can be produced. As such, there is potentially a wide variety of results in beverages that could occur. The focus of this disclosure will be on maintaining consistency in a specific type of bean used with a grinder and an espresso machine so that the combination of the elements is consistently maintained. In other words, even though there is a high degree of variability among coffee beans, the present disclosure is intended to provide a system, method, and apparatus which will automatically adjust the equipment to be maintained with in predetermined tolerance levels so at least the mechanical aspects associated with the bean and grinding of the beans can be maintained consistently.

This background information provides some information believed by the applicant to be of possible relevance to the present disclosure. No admission is intended, nor should such admission be inferred or construed, that any of the preceding information constitutes prior art against the present invention. Other aims, objects, advantages and features of the invention will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

Figure 1:
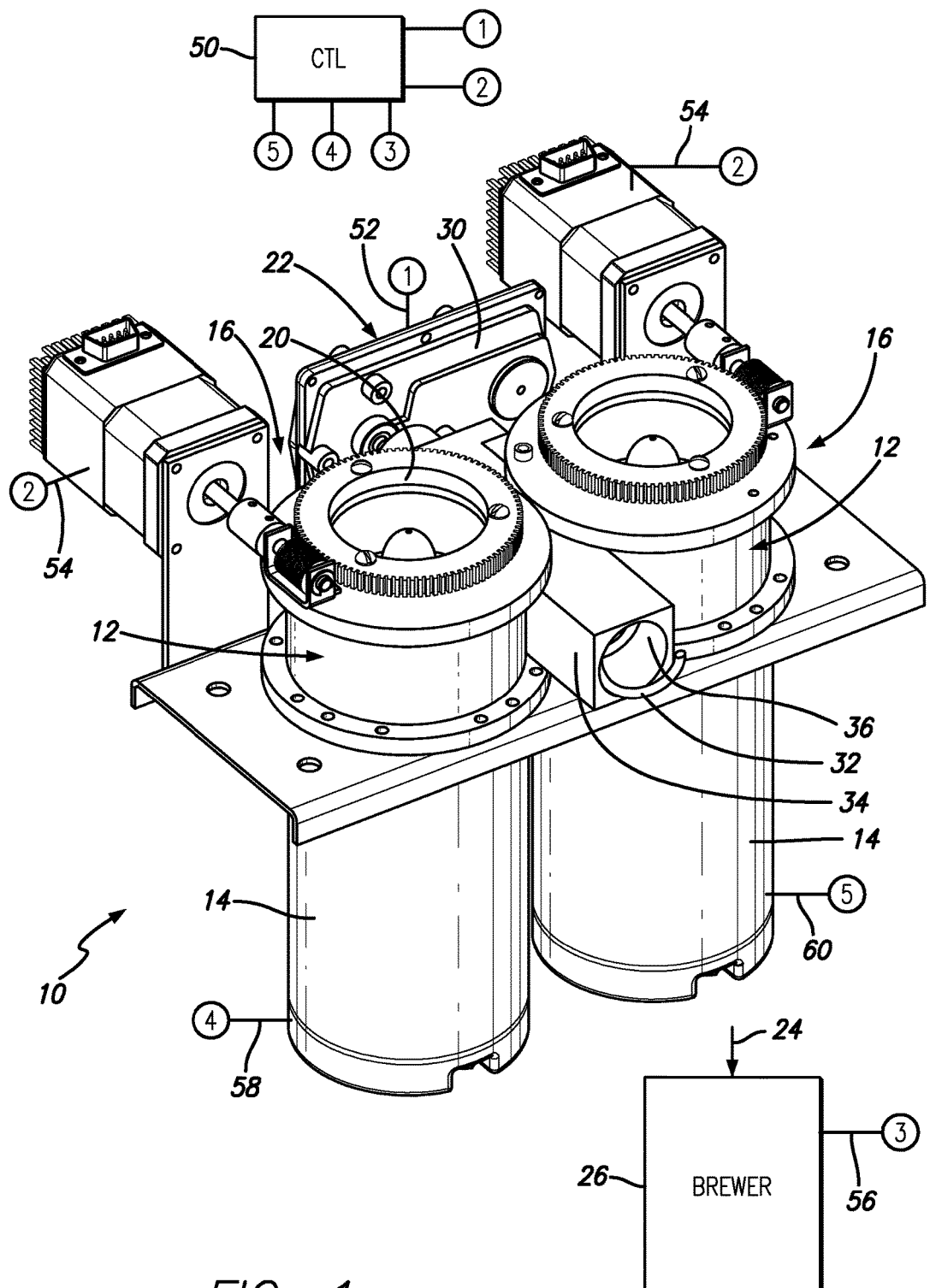
FIG. 1 is a perspective view of a coffee bean grinder which may be used with the present system method and apparatus, each grinder including a grinder motor, a grinder assembly, an adjustment mechanism associated with the grinder assembly, and coupled to a controller for controllably adjusting and operating the corresponding grinder mechanism.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

With regard to the figures, FIG. 1 shows a grinder in combination with general diagrammatic elements of the system of the present disclosure. The grinder 10 includes a grinder mechanism 12 coupled to a grinder motor 14 and includes an adjustment mechanism 16. Bean hoppers (not shown) are coupled to and communicate with the mouth 20 of the grinder mechanism 12 whereupon the beans flow by gravity to be ground by adjustable burrs located in the mechanism 12. An auguring mechanism 22 dispenses 24 the ground coffee into a brewer 26 of known construction. The auguring mechanism 22 includes a drive component 30 and an auger 32 retained in an auger chamber 34. The auger chamber 34 includes an auger passage 36 and an aperture 38 (see FIG. 2). The aperture receives coffee from the chamber for feeding ground coffee from the grinder mechanism 12 to the auger passage 36. The ground coffee is augured for dispensing 24 into the brewer 26.

A controller 50 is provided and coupled to the various mechanisms associated with the grinder 10 and brewer 26 as illustrated by numbered connections 1-5. The controller 50 may be associated with only the grinder 10 or it may also be coupled to the brewer 26. The grinder 10 may be sold as an assembly including the controller 50 for coupling with a brewer 26, sold independently of the grinder and controller. A series of control lines 52, 54, 56, 58, 60 are connected to the controller 50 for use in monitoring and controlling these devices. As will be described in greater detail below, the controller 50 receives information from sensors or monitors associated with various components and provides control signals such as operating the grinder motor 14 for a longer or shorter period of time or adjusting the adjustable mechanism 16 associated with a grinder for increasing or decreasing the particle size of the coffee produced by the grinder. Additionally, the controller can control the brewer 26 to automatically brew one or more cycles in conjunction with the adjustment of the grinder 10 so as to automatically provide a sequence for calibration purposes or for adjustment purposes.

Figure 2:
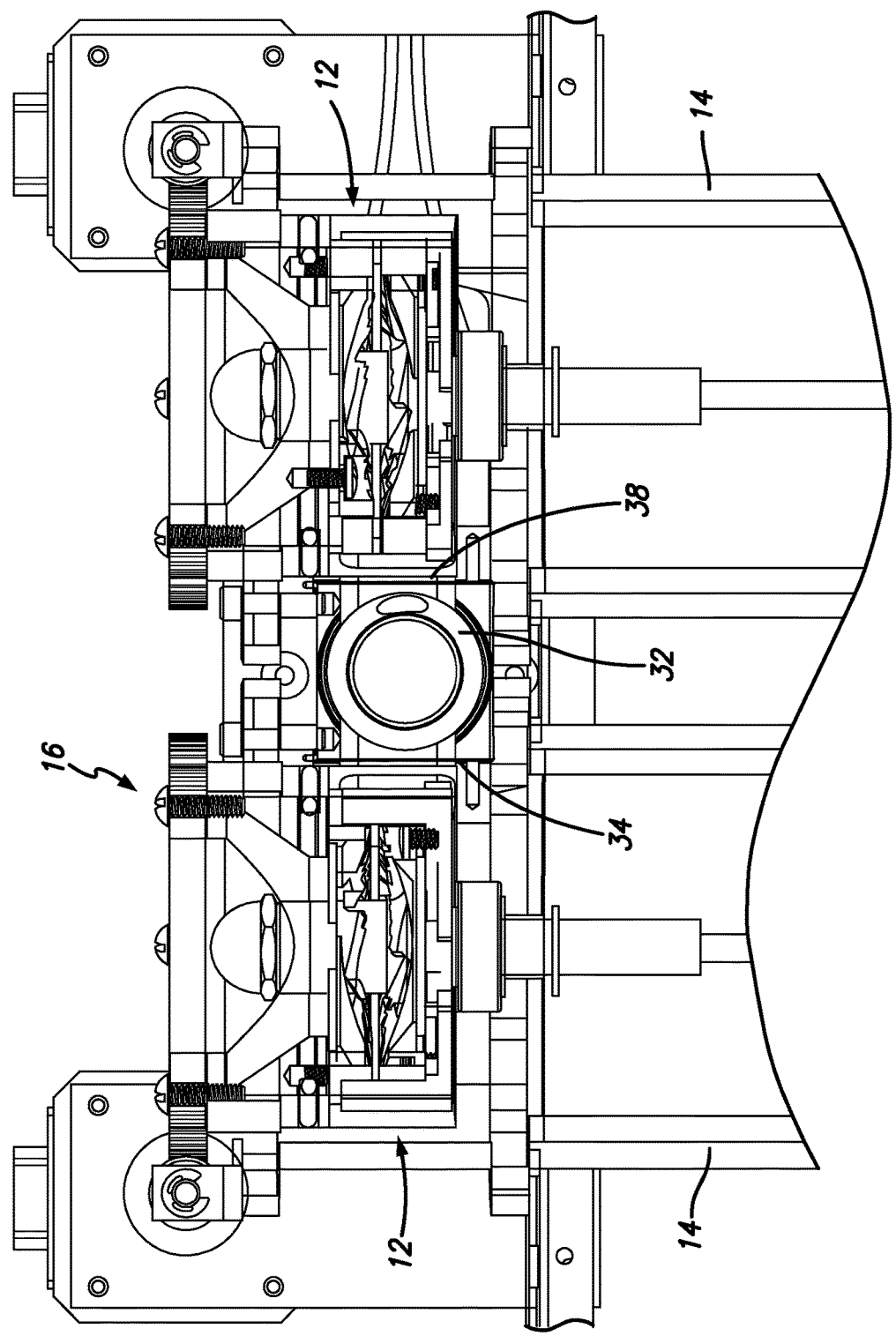
FIG. 2 is a cross sectional view taken along the line 2-2 in FIG. 1 to show some of the mechanical features which are used in this grinder adjustment assembly.

The apparatus as shown in FIGS. 1 and 2 should be broadly interpreted. The present application is not limited to the specific type of grinder, control system or brewer which is shown and/or described in this disclosure. While block diagrams have been disclosed, reference to espresso equipment has been identified. The fact that espresso equipment has been identified in this application should not limit the application of the systems, methods and apparatus to other equipment related to food grinding. As such, it is envisioned that similar systems could be used with drip brew processes, other beverage brewing processes as well as, for example, material dispensing processes which provide additional monitoring and feedback to facilitate adjustment of the associated mechanisms. With the foregoing in mind, all reference to all items identified in the present disclosure should be broadly interpreted to include those items which are currently known and hereafter developed applicable to these type of systems.

Figure 3:
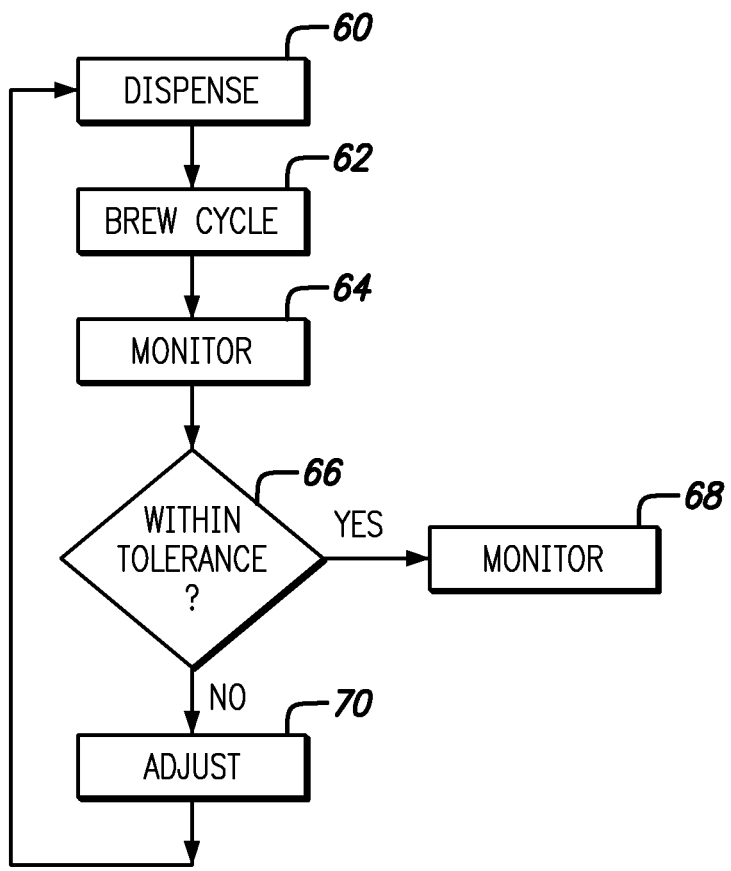
FIG. 3 is a process flow chart associated with some steps used in the monitoring, operation, and adjustment of the grinder.

With reference to FIG. 3, a general flow diagram is provided. Additional disclosures provided during the explanation of FIG. 3 further reference to FIGS. 1 and 2. With reference to FIG. 3, the process of calibrating or making adjustments to the grinder mechanism starts with step 60. Step 60 involves dispensing material, in this case coffee beans, which are ground in the grinding mechanism 12 and then dispensed at 24 into the brewer 26. The grinder settings for step 60 will be those which were automatically adjusted based on a reference or based on the previous settings from the previous grind. With the coffee 24 dispensed into the brewer 26 a brew cycle can be commenced. The brew cycle, in this case using an espresso machine, includes compacting the ground coffee in an espresso brewing chamber, introducing heated water at a predetermined pressure for infusion through the compacted ground coffee. As the water is driven through the coffee an espresso beverage is dispensed from the brew chamber.

During this brew cycle a variety of parameters or variables can be monitored. The brewer can be configured with sensors on the compacting mechanism to detect the dimension or depth of the coffee as it is compacted or at the completion of the compaction. Compaction can occur by way of sensing pulses by the compacting motor on the mechanism. Another way to sense compaction would be using a force sensor to detect a degree of compaction either in the chamber or on a device, such as a piston, used to compact the coffee. Other means of detecting compaction, dimensions, or force might be used to determine the characteristics of the ground coffee which has been dispensed from the grinder 10 into the brewer 26. The actual height can be sensed through an appropriate sensing mechanism either directly detected within the brew chamber or by relative calculation of the movement of a piston or other compacting mechanism on the ground coffee.

For example, if the compaction is detected by means of a force detecting relationship, another characteristic, such as a number of pulses to achieve that force might be detected. This information can then be provided to the controller 50 to determine whether it is in within or outside of a predetermined tolerance for this characteristic. Generally, the sensing of this characteristic will not abort the brew cycle but will be stored for use in comparison and, perhaps averaging, relative to a set of tolerances. Another parameter that can be monitored 64 during the brew cycle 62 is the brew time. Brew time, the time from the start of dispensing water through the ground coffee to the end of draining coffee from the brew chamber can be measured from the start of the dispensing of the water until the breaking of the flow of coffee from the brew chamber. Brew time can be correlated to the particle size, the type of material in the bean, moisture content in the bean, solubility of materials in the beans, etc. Brew time can be important for this calibration since it may be desirable to maintain a consistent brew time. Once again, when the brew time is measured it can be provided to the controller 50 for comparison to a predetermined set of tolerances.

The controller 50 can then compare the detected conditions to the defined tolerances 66, which may be stored in a look up table, to determine whether the setting is within or outside of the tolerances. If the setting is within the tolerances then the setting can be maintained 68 for the next brew cycle. If it is outside of the predetermined tolerances it can be adjusted 70 for the next brew cycle. We will discuss the magnitude of adjustment below. However, returning to the maintenance of the setting for the next brew cycle, this information may be used for only the next brew cycle or for a series of subsequent brew cycles. In this regard, the setting can be compared to a predetermined number of previous settings to provide an average or leveling of the settings to determine if there is a trend in the detected settings. As an example, the last five cycles can be monitored for a trend calculation, detection, or other appropriate analysis. Of course, additional monitoring data points can be used in this analysis and the analysis can involve any number of refinements to account for anomalies, changes in type of bean, changes in weather, altitude, or other conditions.

If an adjustment is required 70 then the determination needs to be made as to what kind of adjustment and how extensive of an adjustment might be required. With regard to the type of adjustment, the grinder can be adjusted by changing the length of grind time as a result of controlling the grinder motor 14 for more or less time. Additionally, the adjustment mechanism 16 can be adjusted to increase or decrease the grind particle size (fine/coarse). Additionally, a combination of settings could be used such as increasing particle size and increasing grind time, increasing particle size and decreasing grind time, decreasing particle size and increasing grind time, and decreasing particle size and decreasing grind time. Additionally, either increasing or decreasing the grind size or, separately, increasing or decreasing the grind time may also be a setting.

The magnitude of the adjustment should be taken into account as well. In this regard, a comparison of the information may be made against a number of cycles and the relative range of tolerances to determine if it is significantly outside the tolerance range or merely slightly outside the tolerance range. The system can set a secondary tolerance which will then be used to determine the magnitude of the adjustment or multiple adjustments that are achieved. This will prevent having a series of undesirable results by using only minor adjustments over time to return to an adjustment within the tolerance range. In other words, a relatively significant adjustment, or an adjustment of a larger magnitude can be made depending on the degree of deviation from the established, predetermined tolerances to more quickly bring the system back into adjustment within the predetermined tolerances. If an adjustment is made, the system can be configured to monitor the next brew cycle to determine if the adjustment was satisfactory using the primary steps as set forth in FIG. 3.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A grinder used for grinding a food product, the grinder comprising:
    a grinder mechanism configured to grind a food product received in the grinder mechanism to form ground material;
    an auger mechanism coupled to the grinder mechanism for dispensing the ground material from the grinder mechanism into a brewer for mixing with water in a brew cycle to form a brewed beverage, the brewer including a compacting mechanism for compacting the ground material received into the brewer as part of the brew cycle;
    an adjustment mechanism coupled to the grinder mechanism and configured to adjust an average particle size range of the ground material formed by the grinder mechanism; and
    a controller coupled to the grinder mechanism and the compacting mechanism of the brewer for operating the grinder mechanism to dispense a predetermined quantity of ground material into the brewer and controlling the compacting mechanism to compact the ground material in the brewer for the brew cycle,
    wherein the controller is configured to monitor conditions of the brew cycle and adjust at least one of the average particle size range of the ground material by controlling the adjustment mechanism and an amount of ground material formed by the grinder mechanism by controlling a grind time used to form the ground material based on the monitored conditions of the brew cycle to maintain a predetermined tolerance of the ground material for use in a subsequent brew cycle.

2. The grinder of claim 1, wherein the food product is coffee.

3. The grinder of claim 1, wherein the monitored condition of the brew cycle includes a level of compaction of the ground material during the brew cycle that is indicative of the amount of the ground material formed by the grinder mechanism, and wherein the grind time is adjusted by the controller to adjust the amount of ground material formed by the grinder mechanism to be within the predetermined tolerance.

4. The grinder of claim 1, wherein the monitored condition of the brew cycle includes a brew time for forming a brewed beverage using the ground material during the brew cycle that is indicative of the average particle size of the ground material formed by the grinder mechanism, and wherein the adjustment mechanism is controlled by the controller to adjust the average particle size of the ground material formed by the grinder mechanism to be within the predetermined tolerance.

5. The grinder of claim 1, further comprising at least one sensor associated with the compacting mechanism to detect a dimension of the ground material compacted thereby in the brewer, wherein the controller is coupled to the at least one sensor for detecting a dimension of the ground material in the brewer when compacted, and wherein the controller is configured to monitor the at least one sensor to compare the detected dimension of the ground coffee from one brew cycle to another and to adjust the grinder mechanism to increase or decrease the ground coffee particle size depending on the condition detected so as to maintain a predetermined tolerance of the ground material produced by the grinder mechanism.

* * * * *